United States Patent
Birklbauer et al.

(10) Patent No.: US 11,665,334 B2
(45) Date of Patent: May 30, 2023

(54) ROLLING SHUTTER CAMERA PIPELINE EXPOSURE TIMESTAMP ERROR DETERMINATION

(71) Applicants: Clemens Birklbauer, Vienna (AT); Alexander Kane, Vienna (AT); Dominik Schnitzer, Vienna (AT)

(72) Inventors: Clemens Birklbauer, Vienna (AT); Alexander Kane, Vienna (AT); Dominik Schnitzer, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/204,076

(22) Filed: Mar. 17, 2021

(65) Prior Publication Data

US 2021/0409678 A1    Dec. 30, 2021

Related U.S. Application Data

(60) Provisional application No. 63/046,383, filed on Jun. 30, 2020.

(51) Int. Cl.
*H04N 17/00* (2006.01)
*H04N 5/353* (2011.01)
*H04N 5/225* (2006.01)

(52) U.S. Cl.
CPC ......... *H04N 17/002* (2013.01); *H04N 5/2256* (2013.01); *H04N 5/3532* (2013.01)

(58) Field of Classification Search
CPC .. H04N 17/002; H04N 5/2256; H04N 5/3532; H04N 5/2353; H04N 5/23218; H04B 10/116

See application file for complete search history.

(56) References Cited

U.S. PATENT DOCUMENTS

2012/0199655 A1 * 8/2012 Fukuba ............ G06K 7/10811
235/455
2020/0099824 A1 * 3/2020 Benemann ............ G01S 17/86

FOREIGN PATENT DOCUMENTS

EP    2940897 B1    3/2020

OTHER PUBLICATIONS

International Search Report and Written Opinion for International Application No. PCT/US2021/037317, dated Oct. 4, 2021 (dated Apr. 10, 2021)—13 pages.

(Continued)

*Primary Examiner* — Yogesh K Aggarwal
(74) *Attorney, Agent, or Firm* — Culhane Meadows PLLC; Stephen J. Weed

(57) ABSTRACT

Camera pipeline exposure timestamp error determination methods and systems that detect latency in rolling shutter camera systems. The exposure timestamp error determination system includes a rolling shutter image sensor configured to capture an image and a processor. The processor determines timestamp error by capturing the image using the rolling shutter image sensor where the image includes a bar code encoded with a barcode timestamp. The processor then obtains a system exposure timestamp corresponding to capture of the image by the rolling shutter image sensor and the barcode timestamp by decoding the bar code. Pipeline exposure timestamp error is then determined for the rolling shutter camera system by comparing the obtained barcode timestamp to the system exposure timestamp.

21 Claims, 16 Drawing Sheets

(56) References Cited

OTHER PUBLICATIONS

Mehrabi Maziar et al: :Frame Synchronization of Live Video Streams Using Visible Light Communication, 2015 IEEE International Symposium on Multimedia (ISM), IEEE, Dec. 14, 2015 (Dec. 14, 2015), pp. 128-131.

* cited by examiner

ROLLING SHUTTER CAMERA PIPELINE EXPOSURE TIMESTAMP ERROR DETERMINATION

TECHNICAL FIELD

The present subject matter relates to imaging systems, e.g., cameras for use in eyewear devices, and, in particular, determining camera pipeline exposure timestamp error in rolling shutter camera systems.

BACKGROUND

Rolling shutter camera systems capture images by scanning across a scene of an image on an imaging sensor (e.g., a CMOS sensor). With a rolling shutter, the top row of the imaging sensor starts exposing before the bottom row starts. When the exposure time is reached, the top row is read out while the other rows are still being exposed. All rows are exposed for the same period of time but the time in which they start and stop exposing are different. This allows the imaging sensor to gather photons in some rows during an acquisition process while other rows are being read out, thus effectively increasing sensitivity.

Stereoscopic imaging systems utilize two or more imaging sensors to capture images from different viewpoints in order to create three-dimensional (3D) images, for example. The captured images are synchronized in time to produce realistic 3D images.

BRIEF DESCRIPTION OF THE DRAWINGS

The drawing figures depict one or more implementations, by way of example only, not by way of limitations. In the figures, like reference numerals refer to the same or similar elements with a letter designation added to differentiate between the same or similar elements. The letter designation may be dropped when the same or similar elements are referred to collectively or when referring to a non-specific one of the same or similar elements.

DETAILED DESCRIPTION

Figure 1A:
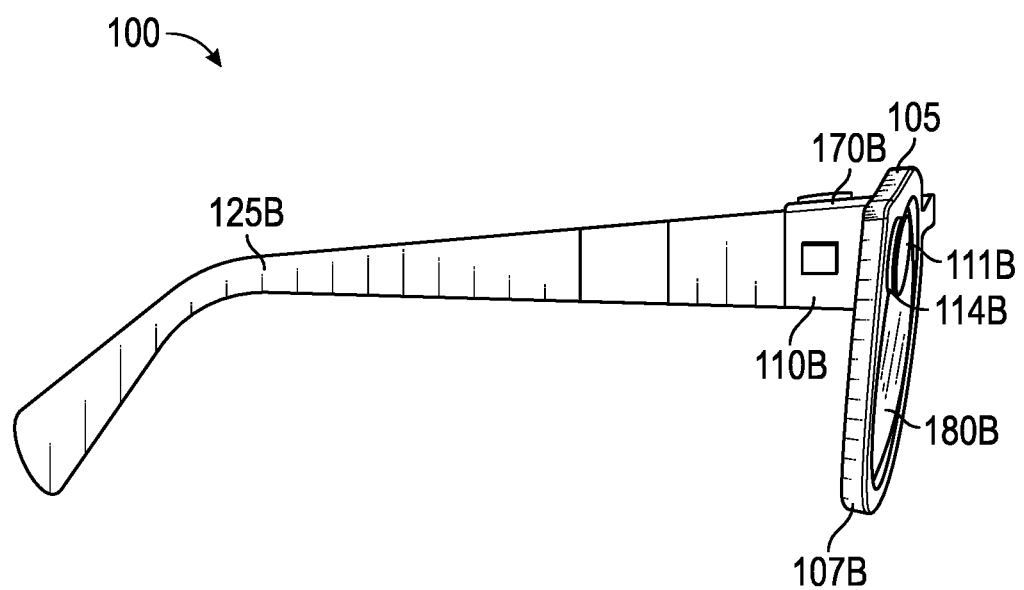
FIG. 1A is a side view of an example hardware configuration of an eyewear device utilized in a camera pipeline exposure timestamp error determination system.

Visible light communication (VLC) is used in a camera system to determine exposure timestamp error within a camera pipeline of a device under test (DUT; e.g., due to a rolling shutter image sensor, an image signal processor (ISP), an operating system (OS), or an imaging application). A test generation system (TGS) determines a current time for transmission to the DUT through VLC. A light source (light emitting diode; LED) of the TGS is positioned in front of the image sensor of a rolling shutter camera system of the DUT. Electronics control the light source using very short exposure times (e.g., 10 microseconds) at a frequency matched to the rolling shutter rate of the rolling shutter image sensor to create an image including white and black lines. By varying the length of the flashes, a barcode is produced by the rolling shutter image sensor upon being read that is encoded with the current time at which the TGS is presenting the flashes of light.

The difference between values corresponding to the time embedded in the image (i.e., the time encoded in the barcode; TGS(1)) and an exposure time of the image by the rolling shutter image sensor (e.g., as determined by a component of the rolling shutter camera system; DUT(1)) represents an exposure timestamp error in the rolling shutter camera pipeline. Where the clocks of the DUT and TGS are in the same time domain (i.e., operating off the same clock or with synchronized clocks; DUT(2)=TGS(2)), the pipeline exposure timestamp error is the difference between the time embedded in the image and the exposure time of the image (e.g., TGS(1)–DUT(1)). Where the clocks of the DUT and TGS are in different time domains (i.e., DUT(2)<>TGS(2)), the pipeline exposure timestamp error is the difference between a first difference at the TGS (TGS(2)–TGS(1)) and a second difference at the DUT (DUT(2)–DUT(1)). Generally, as error is reduced, computer vision (CV) and augmented reality systems improve. Additionally, in stereoscopic systems having multiple cameras more realistic effects can be achieved by reducing exposure timestamp error and by having similar exposure timestamp error times for each of the multiple cameras. Thus, determining the error in such system pipelines is useful during the design phase for selecting components and in final products to compensate for delays/errors.

In this detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

As used herein, the term "coupled" or "connected" refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for camera misalignment compensation, the eyewear device may be oriented in any other direction suitable to the application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
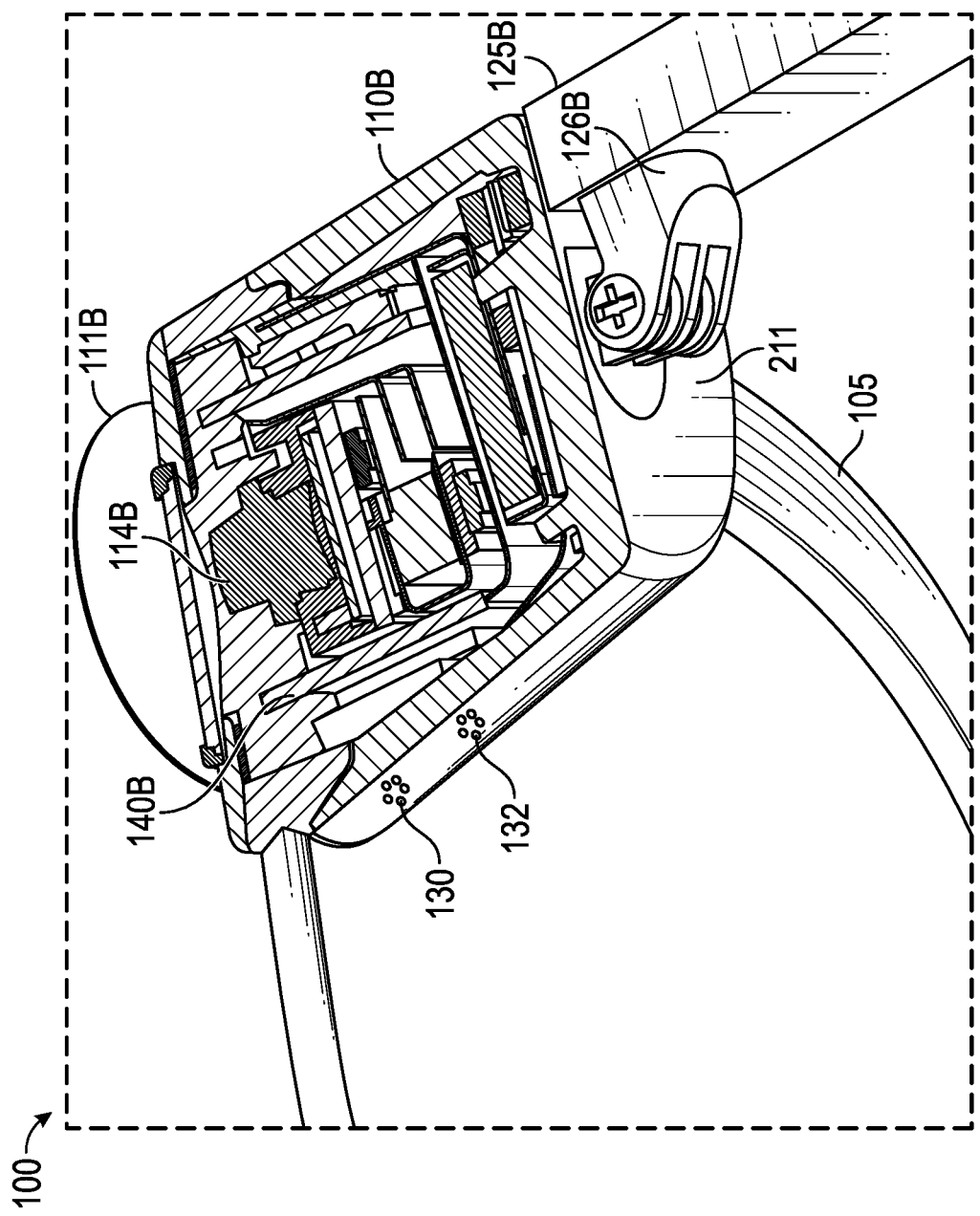
FIG. 1B is a top cross-sectional view of a right electronic housing of the eyewear device of FIG. 1A depicting a right visible light camera of a depth-capturing camera, and a circuit board.

As shown in FIGS. 1A and 1B, the eyewear device 100 includes a right visible light camera 114B. The eyewear device 100 can include multiple visible light cameras, e.g., the right visible light camera 114A (FIGS. 1A and 1B) and a left visible light camera 114B (FIGS. 1C and 1D) that form a passive type of depth-capturing camera, such as stereo camera, of which the right visible light camera 114B is located on a right electronic housing 110B and the left visible light camera 114A is located on a left electronic housing 110A.

Left and right visible light cameras 114A and 114B are sensitive to the visible light range wavelength. Each of the visible light cameras 114A and 114B have a different frontward facing field of view which are overlapping to allow three-dimensional depth images to be generated, for example, right visible light camera 114B has the depicted right field of view 111B. Generally, a "field of view" is the part of the scene that is visible through the camera at a position and orientation in space. Objects or object features outside the field of view 111A and 111B when the image is captured by the visible light camera are not recorded in a raw image (e.g., photograph or picture). The field of view describes an angle range or extent which the image sensor of the visible light camera 114A and 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A and 114B have a field of view with an angle of view between 15° to 110°, for example 24°, and have a resolution of 480–480 pixels or greater. The "angle of coverage" describes the angle range that a lens of visible light cameras 114A and 114B or infrared camera 220 (see FIG. 2A) can effectively image. Typically, the image circle produced by a camera lens is large enough to cover the film or sensor completely, possibly including some vignetting (i.e., a reduction of an image's brightness or saturation at the periphery compared to the image center). If the angle of coverage of the camera lens does not fill the sensor, the image circle will be visible, typically with strong vignetting toward the edge, and the effective angle of view will be limited to the angle of coverage.

Examples of such visible lights camera 114A and 114B include a high-resolution complementary metal-oxide-semiconductor (CMOS) image sensor and a video graphic array (VGA) camera, such as 640 p (e.g., 640×480 pixels for a total of 0.3 megapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more. Suitable visible light cameras 114 include complementary metal-oxide-semiconductor (CMOS) sensor cameras with rolling shutter readout. In one example, the cameras 114 include a V-blank period setting for use in minimizing the time difference, T, between feature points obtained by two separate cameras. In another example, the cameras 114 include an exposure delay setting that is counted in sensor lines, such as cameras available from Sony Corporation of Minato, Japan, to postpose readout of one of the cameras in order to expose feature points falling on different lines at substantially the same time. Other suitable cameras will be understood by one of skill in the art from the description herein.

Image sensor data from the visible light cameras 114A and 114B are captured along with geolocation data, digitized by an image processor, and stored in a memory. The captured left and right raw images captured by respective visible light cameras 114A and 114B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and a blue pixel light value); and a position attribute (e.g., an X location coordinate and a Y location coordinate).

To provide stereoscopic vision, visible light cameras 114A and 114B may be coupled to an image processor (element 912 of FIG. 9) for digital processing along with addition of a timestamp in which the image of the scene is exposed or captured. Image processor 912 includes circuitry to receive signals from the visible light cameras 114A and 114B and process those signals from the visible light camera 114 into a format suitable for storage in the memory. The timestamp can be added by the image processor or another processor, which controls operation of the visible light cameras 114A and 114B. Visible light cameras 114A and 114B allow the depth-capturing camera to simulate human binocular vision. The depth-capturing camera provides the ability to reproduce three-dimensional images based on two captured images from the visible light cameras 114A and 114B having the same timestamp. Such three-dimensional images allow for an immersive life-like experience, e.g., for virtual reality or video gaming. Three-dimensional depth videos may be produced by stitching together a sequence of three-dimensional depth images with associated time coordinates for a presentation time in a depth video.

For stereoscopic vision, a pair of raw red, green, and blue (RGB) images are captured of a scene at a moment in time—one image for each of the left and right visible light cameras 114A and 114B. When the pair of captured raw images from the frontward facing left and right field of views 111A and 111B of the left and right visible light cameras 114A and 114B are processed (e.g., by the image processor), depth images are generated, and the generated depth images can be perceived by a user on the optical assembly 180A and 180B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for a depth position (e.g., distance).

A depth video further associates each of a sequence of generated depth images with a time coordinate on a time (T) axis for a presentation time in a depth video (e.g., each depth image includes spatial components as well as a temporal component). The depth video can further include one or more input parameter components (e.g., an audio component such as an audio track or stream, a biometric component such as a heartrate graph, etc.), which may be captured by an input device such as a microphone or a heartrate monitor. Each vertex includes a color attribute (e.g., a red pixel light value, a green pixel light value, and a blue pixel light value); a position attribute (e.g., an X location coordinate, a Y location coordinate, and a Z location coordinate); a texture attribute, a reflectance attribute, or a combination thereof. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A and 114B. Disparity is the difference in image location of the same 3D point when projected under perspective of the visible light cameras 114A and 114B ($d = x_{left} - x_{right}$). For visible light cameras 114A and 114B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used.

In an example, a camera pipeline exposure timestamp error determination system includes the eyewear device 100. The eyewear device 100 includes a frame 105 and a left temple 125A extending from a left lateral side 170A of the frame 105 and a right temple 125B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A and 114B and a depth sensor (element 213 of FIG. 2A). In one example, the depth-capturing camera includes a left visible light camera 114A with a left field of view 111A connected to the frame 105 or the left temple 125A to capture a left image of the scene. Eyewear device 100 further includes a right visible light camera 114B connected to the frame 105 or the right temple 125B with a right field of view 111B to capture (e.g., simultaneously with the left visible light camera 114A) a right image of the scene which partially overlaps the left image.

The camera pipeline exposure timestamp error determination system further includes a computing device, such as a host computer (e.g., mobile device 990 of FIGS. 9 and 10) coupled to eyewear device 100 over a network. The camera pipeline exposure timestamp error determination system further includes an image display (optical assembly 180A and 180B of eyewear device; image display 1080 of mobile device 990 of FIG. 10) for presenting (e.g., displaying) a video including images. The camera pipeline exposure timestamp error determination system further includes an image display driver (element 942 of eyewear device 100 of FIG. 9; element 1090 of mobile device 990 of FIG. 10) coupled to the image display (optical assembly 180A and 180B of eyewear device; image display 1080 of mobile device 990 of FIG. 10) to control the image display to present the initial video.

In some examples, user input is received to indicate that the user desires to capture an image. For example, the camera pipeline exposure timestamp error determination system further includes a user input device to receive a user input. Examples of user input devices include a touch sensor (element 991 of FIG. 9 for the eyewear device 100), a touch screen display (element 1091 of FIG. 10 for the mobile device 1090), a visual detection system (e.g., including machine vision for processing images gathered by one or more visible light cameras 114A, V), and a computer mouse for a personal computer or a laptop computer. The camera pipeline exposure timestamp error determination system further includes a processor (element 932 of eyewear device 100 of FIG. 9; element 1030 of mobile device 990 of FIG. 10) coupled to the eyewear device 100 and the depth-capturing camera. The camera pipeline exposure timestamp error determination system further includes a memory (element 934 of eyewear device 100 of FIG. 9; elements 1040A-B of mobile device 990 of FIG. 10) accessible to the processor, and programming in the memory (element 945 of eyewear device 100 of FIG. 9; element 945 of mobile device 990 of FIG. 10), for example in the eyewear device 100 itself, mobile device (element 990 of FIG. 9), or another part of the camera pipeline exposure timestamp error determination system (e.g., server system 998 of FIG. 9).

In one example, execution of camera pipeline exposure timestamp error programming (element 945 of FIG. 9) by the processor (element 932 of FIG. 9) configures the eyewear device 100 to determine pipeline exposure timestamp error when processing images. In another example, execution of the camera pipeline exposure timestamp error determination programming (element 945 of FIG. 10) by the processor (element 945 of FIG. 10) configures the mobile device (element 990 of FIG. 10) of the camera pipeline exposure timestamp error determination system to determine pipeline exposure timestamp error when processing images.

Figure 1C:
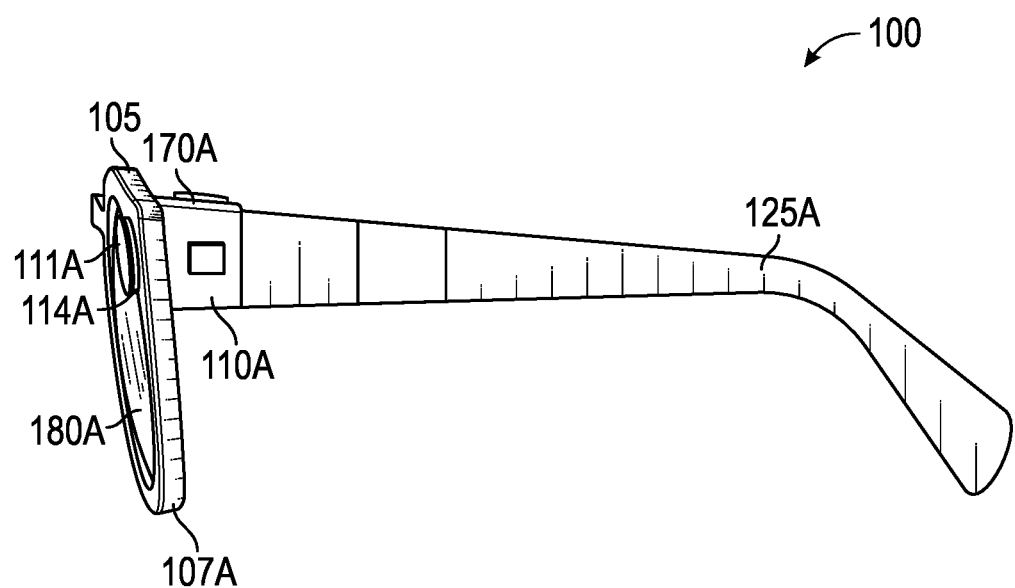
FIG. 1C is a left side view of an example hardware configuration of an eyewear device of FIG. 1A, which shows a left visible light camera of the depth-capturing camera.
Figure 1D:
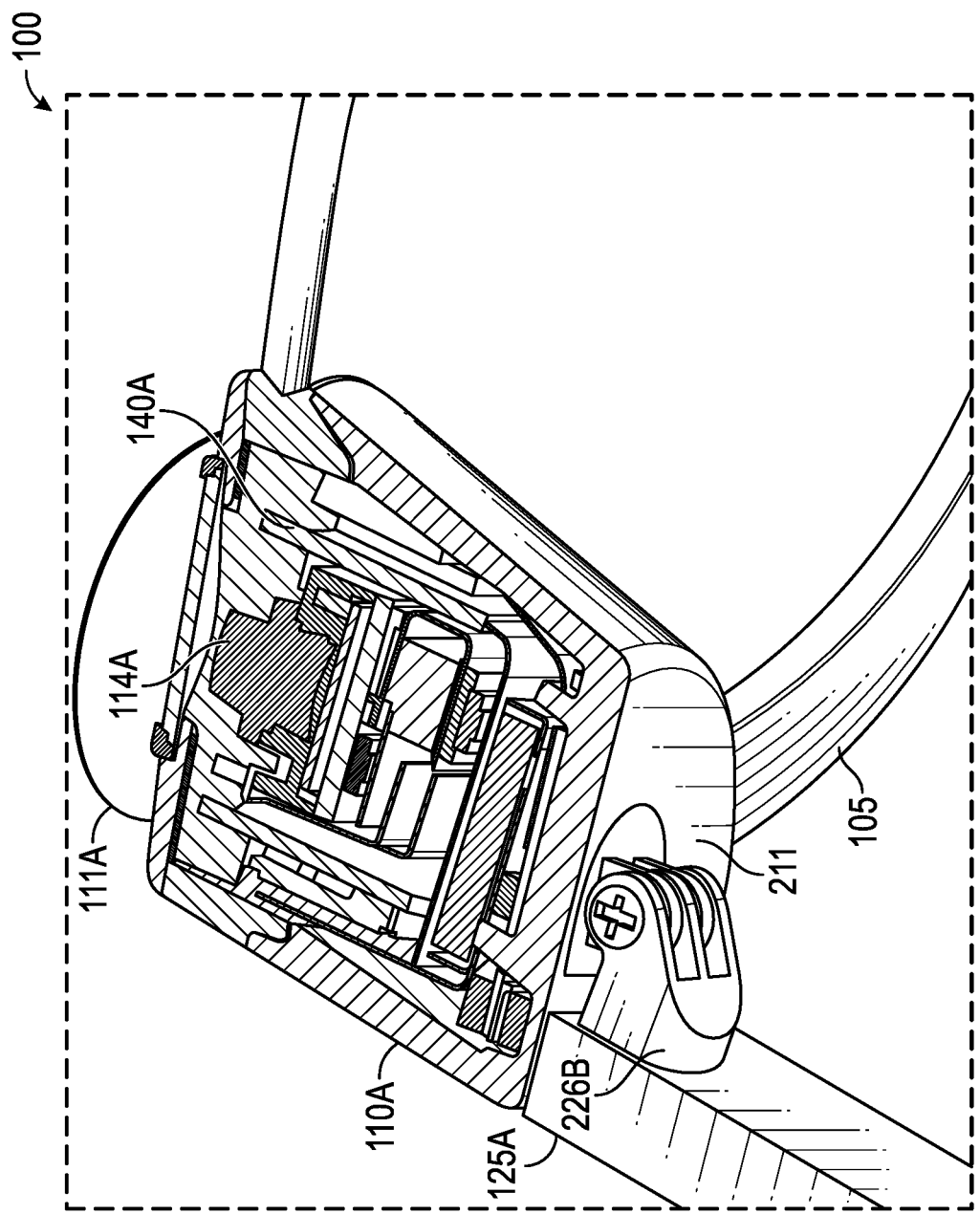
FIG. 1D is a top cross-sectional view of a left electronic housing of the eyewear device of FIG. 1C depicting the left visible light camera of the depth-capturing camera, and the circuit board.

FIG. 1B is a top cross-sectional view of a right electronic housing 110B of the eyewear device 100 of FIG. 1A depicting the right visible light camera 114B of the depth-capturing camera, and a circuit board. FIG. 1C is a left side view of an example hardware configuration of an eyewear device 100 of FIG. 1A, which shows a left visible light camera 114A of the depth-capturing camera. FIG. 1D is a top cross-sectional view of a left electronic housing 110A of the eyewear device of FIG. 1C depicting the left visible light camera 114A of the depth-capturing camera, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 126B connects the right electronic housing 110B to a right temple 125B of the eyewear device 100. In some examples, components of the right visible light camera 114B, the flexible PCB 140B, or other electrical connectors or contacts may be located on the right temple 125B or the right hinge 126B.

The right electronic housing 110B includes electronic housing body 211 and an electronic housing cap, with the electronic housing cap omitted in the cross-section of FIG. 1B. Disposed inside the right electronic housing 110B are various interconnected circuit boards, such as PCBs or flexible PCBs, that include controller circuits for right visible light camera 114B, microphone(s), low-power wireless circuitry (e.g., for wireless short-range network communication via Bluetooth™), high-speed wireless circuitry (e.g., for wireless local area network communication via Wi-Fi).

The right visible light camera 114B is coupled to or disposed on the flexible PCB 240 and covered by a visible light camera cover lens, which is aimed through opening(s) formed in the frame 105. For example, the right rim 107B of the frame 105 is connected to the right electronic housing 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing field of view 111B with a line of sight or perspective of the right eye of the user of the eyewear device 100. The visible light camera cover lens can also be adhered to an outward facing surface of the right electronic housing 110B in which an opening is formed with an outward facing angle of coverage, but in a different outward direction. The coupling can also be indirect via intervening components.

Left (first) visible light camera 114A is connected to a left image display of left optical assembly 180A and captures a left eye viewed scene observed by a wearer of the eyewear device 100 in a left raw image. Right (second) visible light camera 114B is connected to a right image display of right optical assembly 180B and captures a right eye viewed scene observed by the wearer of the eyewear device 100 in a right raw image. The left raw image and the right raw image partially overlap for use in presenting a three-dimensional observable space of a generated depth image.

Flexible PCB 140B is disposed inside the right electronic housing 110B and is coupled to one or more other components housed in the right electronic housing 110B. Although shown as being formed on the circuit boards of the right electronic housing 110B, the right visible light camera 114B can be formed on the circuit boards of the left electronic housing 110A, the temples 125A and 125B, or frame 105.

Figure 2A:
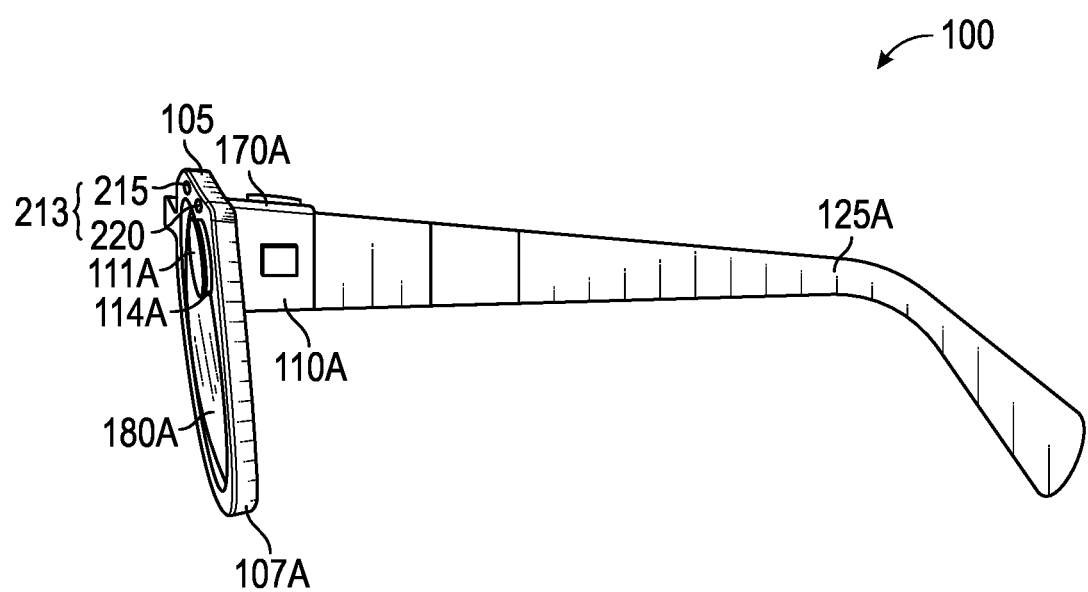
FIG. 2A is a side view of another example hardware configuration of an eyewear device utilized in the camera pipeline exposure timestamp error determination system, which shows the right visible light camera and a depth sensor of the depth-capturing camera to generate an initial depth image of a sequence of initial depth images (e.g., in an initial video).

FIG. 2A is a side view of another example hardware configuration of an eyewear device 100 utilized in the camera pipeline exposure timestamp error determination system. As shown, the depth-capturing camera includes a left visible light camera 114A and a depth sensor 213 on a frame 105 to generate an initial depth image of a sequence of initial depth images (e.g., in an initial video). Instead of utilizing at least two visible light cameras 114A and 114B to generate the initial depth image, here a single visible light camera 114A and the depth sensor 213 are utilized to generate depth images. The infrared camera 220 of the depth sensor 213 has an outward facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A and 114B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right electronic housings 110A and 110B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107A, or in different locations on the frame 105, for example, the infrared emitter 215 is on the left rim 107B and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the electronic housings 110A and 110B, or vice versa. The infrared emitter 215 can be connected essentially anywhere on the frame 105, left electronic housing 110A, or right electronic housing 110B to emit a pattern of infrared in the light of sight of the eye of the user. Similarly, the infrared camera 220 can be connected essentially anywhere on the frame 105, left electronic housing 110A, or right electronic housing 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the electronic housings 110A and 110B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward-facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the camera pipeline exposure timestamp error determination system. Eyewear device 100 or the camera pipeline exposure timestamp error determination system can subsequently process the captured infrared image during generation of three-dimensional depth images of the depth videos, such as the initial depth images from the initial video.

Figure 2B:
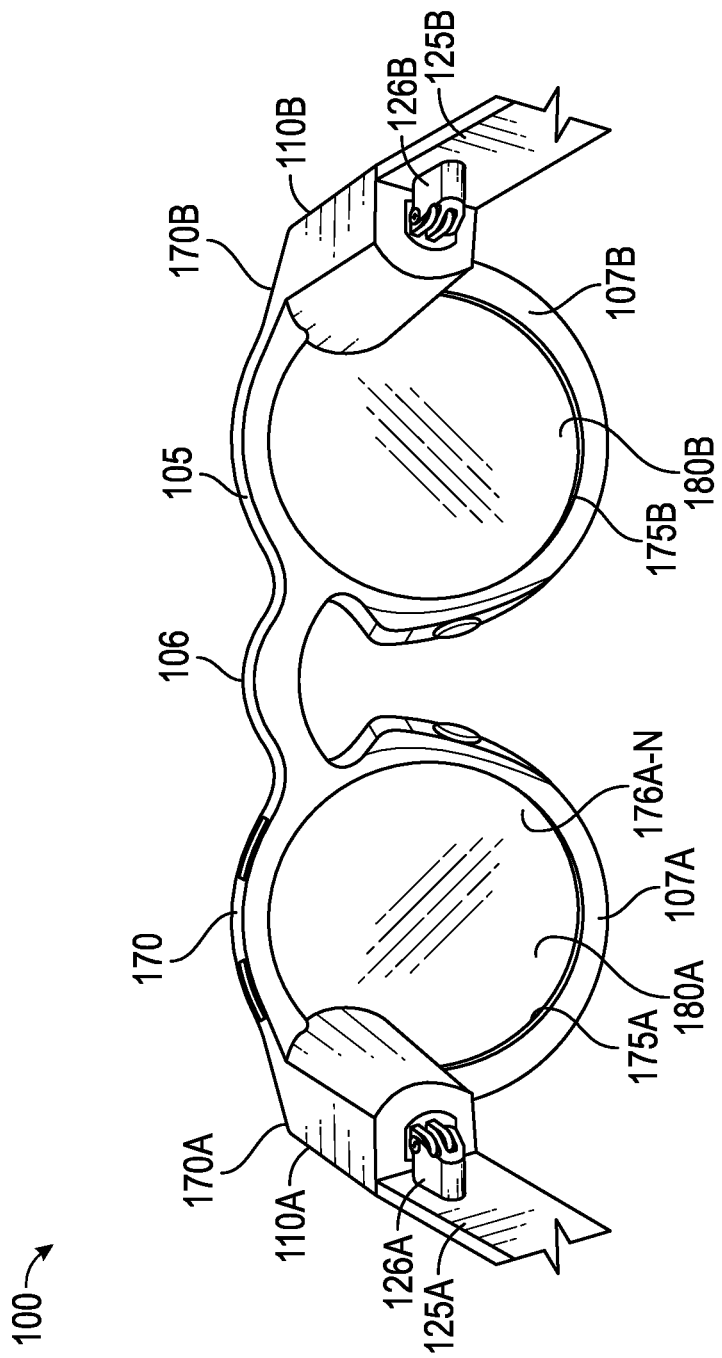
FIGS. 2B and 2C are rear views of example hardware configurations of the eyewear device, including two different types of image displays.
Figure 2C:
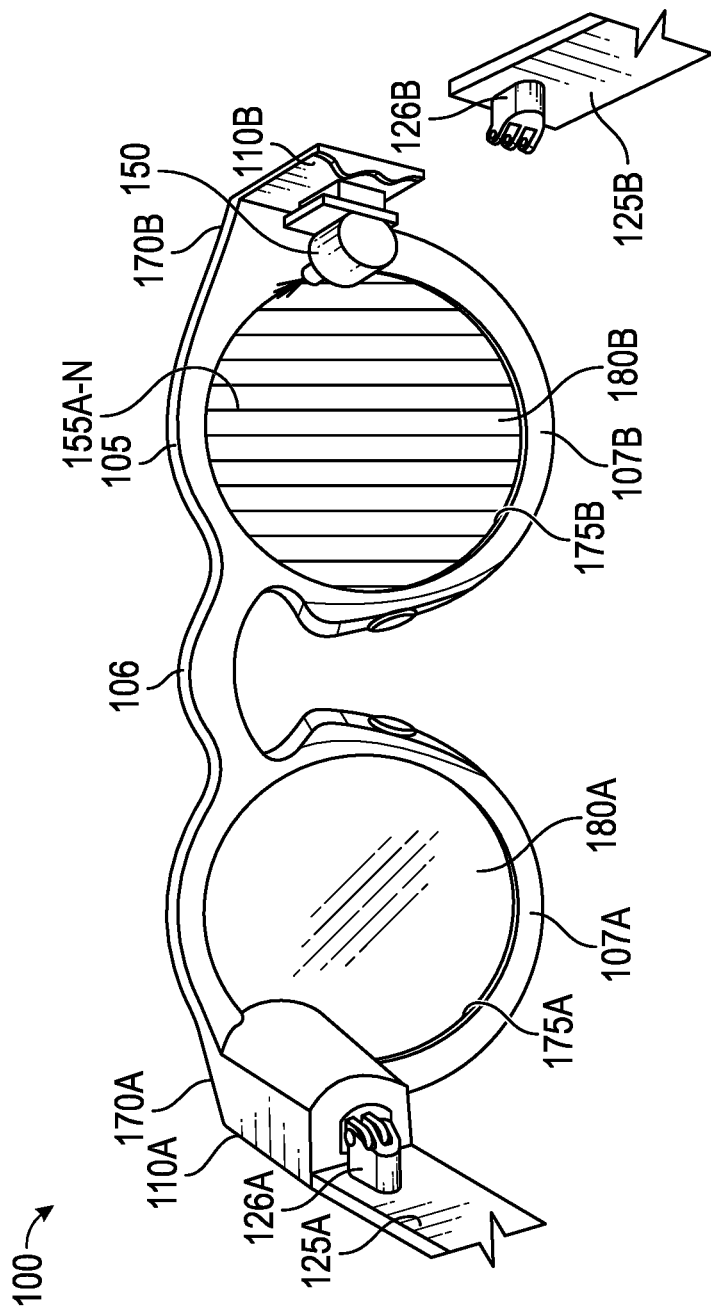

FIGS. 2B and 2C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A and 175B which hold a respective optical element 180A and 180B, such as a lens and a display device. As used herein, the term lens is meant to cover transparent or translucent pieces of glass or plastic having curved or flat surfaces that cause light to converge/diverge or that cause little or no convergence or divergence.

Although shown as having two optical elements 180A and 180B, the eyewear device 100 can include other arrangements, such as a single optical element or may not include any optical element 180A and 180B depending on the application or intended user of the eyewear device 100. As further shown, eyewear device 100 includes a left electronic housing 110A (including a left camera 114A) adjacent the left lateral side 170A of the frame 105 and a right electronic housing 110B (including a right camera 114B) adjacent the right lateral side 170B of the frame 105. The electronic housings 110A and 110B may be integrated into the frame 105 on the respective sides 170A and 170B (as illustrated) or implemented as separate components attached to the frame 105 on the respective sides 170A and 170B. Alternatively, the electronic housings 110A and 110B may be integrated into temples (not shown) attached to the frame 105.

In one example, the image display of the optical assembly 180A and 180B includes an integrated image display. As shown in FIG. 2B, the optical assembly 180A and 180B includes a suitable display matrix 170 of any suitable type, such as a liquid crystal display (LCD), an organic light-emitting diode (OLED) display, or any other such display. The optical assembly 180A and 180B also includes an optical layer or layers 176, which can include lenses, optical coatings, prisms, mirrors, waveguides, optical strips, and other optical components in any combination.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A and 175B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A and 180B includes a projection image display as shown in FIG. 2C. The optical assembly 180A and 180B includes a laser projector 150, which is a three-color laser projector using a scanning mirror or galvanometer. During operation, an optical source such as a laser projector 150 is disposed in or on one of the temples 125A and 125B of the eyewear device 100. Optical assembly 180A and 180B includes one or more optical strips 155A-N spaced apart across the width of the lens of the optical assembly 180A and 180B or across a depth of the lens between the front surface and the rear surface of the lens.

As the photons projected by the laser projector 150 travel across the lens of the optical assembly 180A and 180B, the photons encounter the optical strips 155A-N. When a photon encounters an optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A and 180B, the eyewear device 100 can include other arrangements, such as a single or three optical assemblies, or the optical assembly 180A and 180B may have a different arrangement depending on the application or intended user of the eyewear device 100.

As further shown in FIGS. 2B and 2C, the electronic housings 110A and 110B may be integrated into the frame 105 on the respective lateral sides 170A and 170B (as illustrated) or implemented as separate components attached to the frame 105 on the respective sides 170A and 170B. Alternatively, the electronic housings 110A and 110B may be integrated into temples 125A and 125B attached to the frame 105.

In one example, the image display includes a first (left) image display and a second (right) image display. Eyewear device 100 includes first and second apertures 175A and 175B which hold a respective first and second optical assembly 180A and 180B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
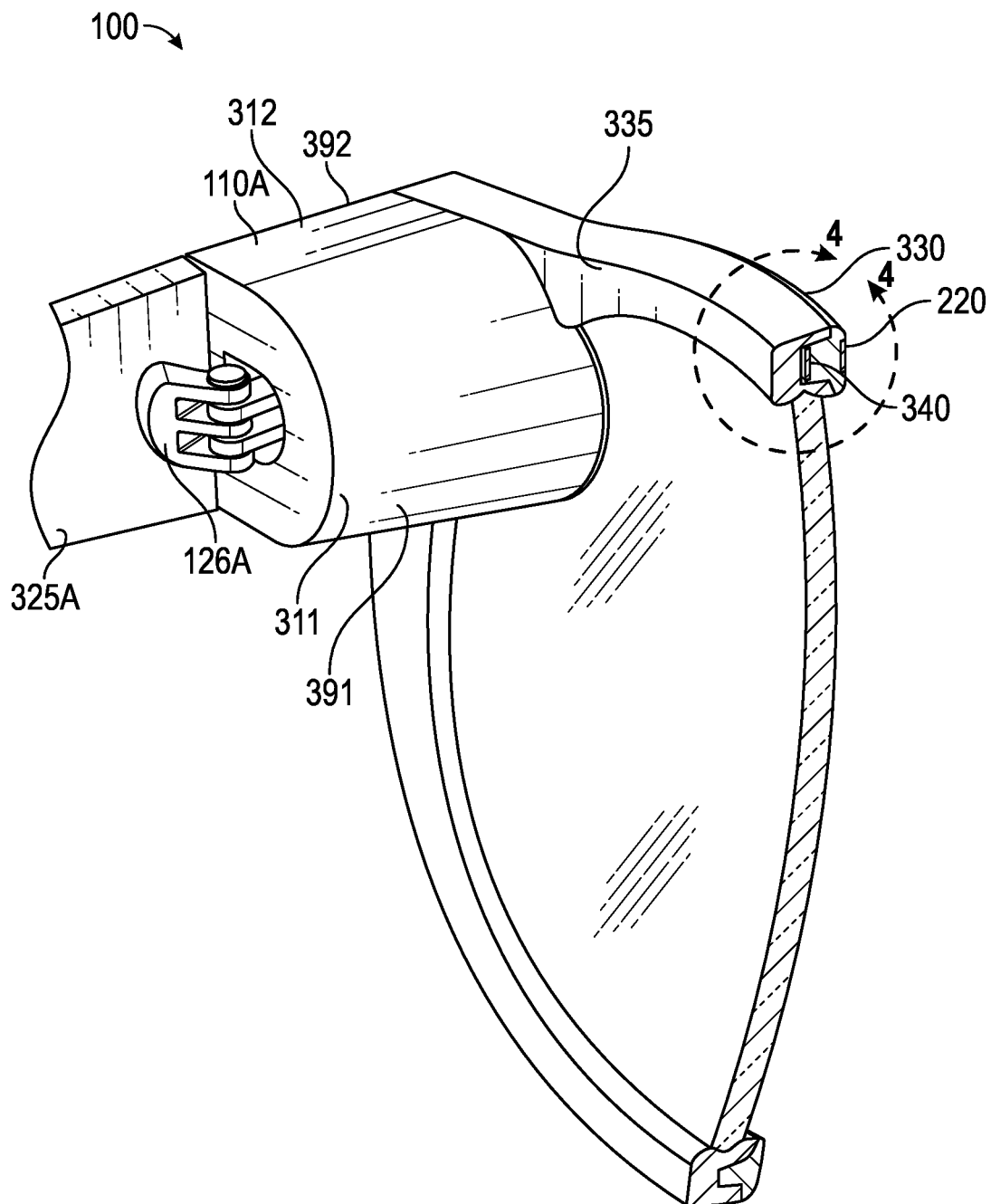
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. The upper portion of the left rim 107A of the frame 105 of the eyewear device 100 includes a frame front 330 and a frame back 335. The frame front 330 includes a front-facing side configured to face outward away from the eye of the user. The frame back 335 includes a rear-facing side configured to face inward toward the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left electronic housing 110A to the left temple 325A via a left hinge 126A. In some examples, components of the depth sensor 213, including the infrared camera 220, the flexible PCB 340, or other electrical connectors or contacts may be located on the left temple 325A or the left hinge 126A.

In an example, the left electronic housing 110A includes an electronic housing body 311, an electronic housing cap 312, an inward facing surface 391 and an outward facing surface 392 (labeled, but not visible). Disposed inside the left electronic housing 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images or depth videos, for example, in combination with right visible light camera 114B.

Figure 4:
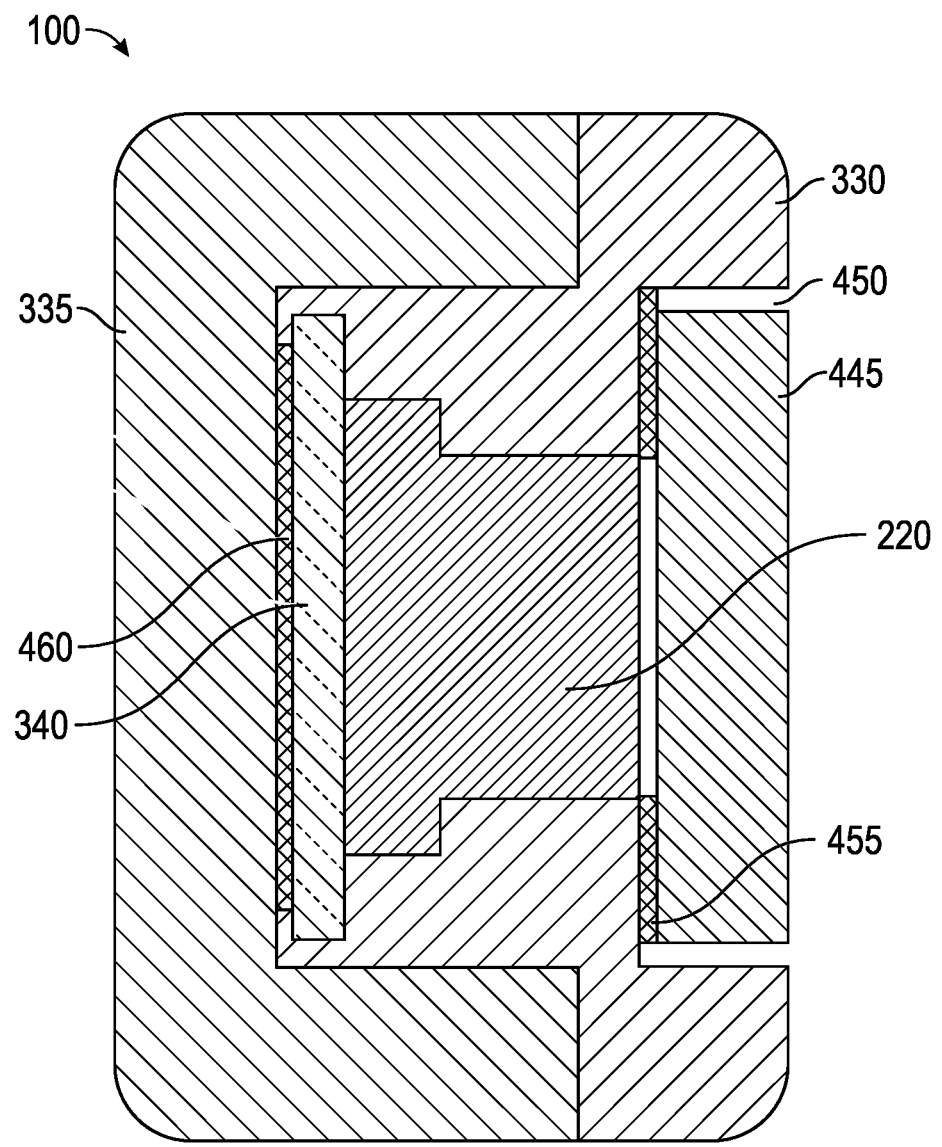
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat which melts a solder paste to connect the two components. In one example, reflowing is used to surface mount the infrared camera 220 on the flexible PCB 340 and electrically connect the two components. However, through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
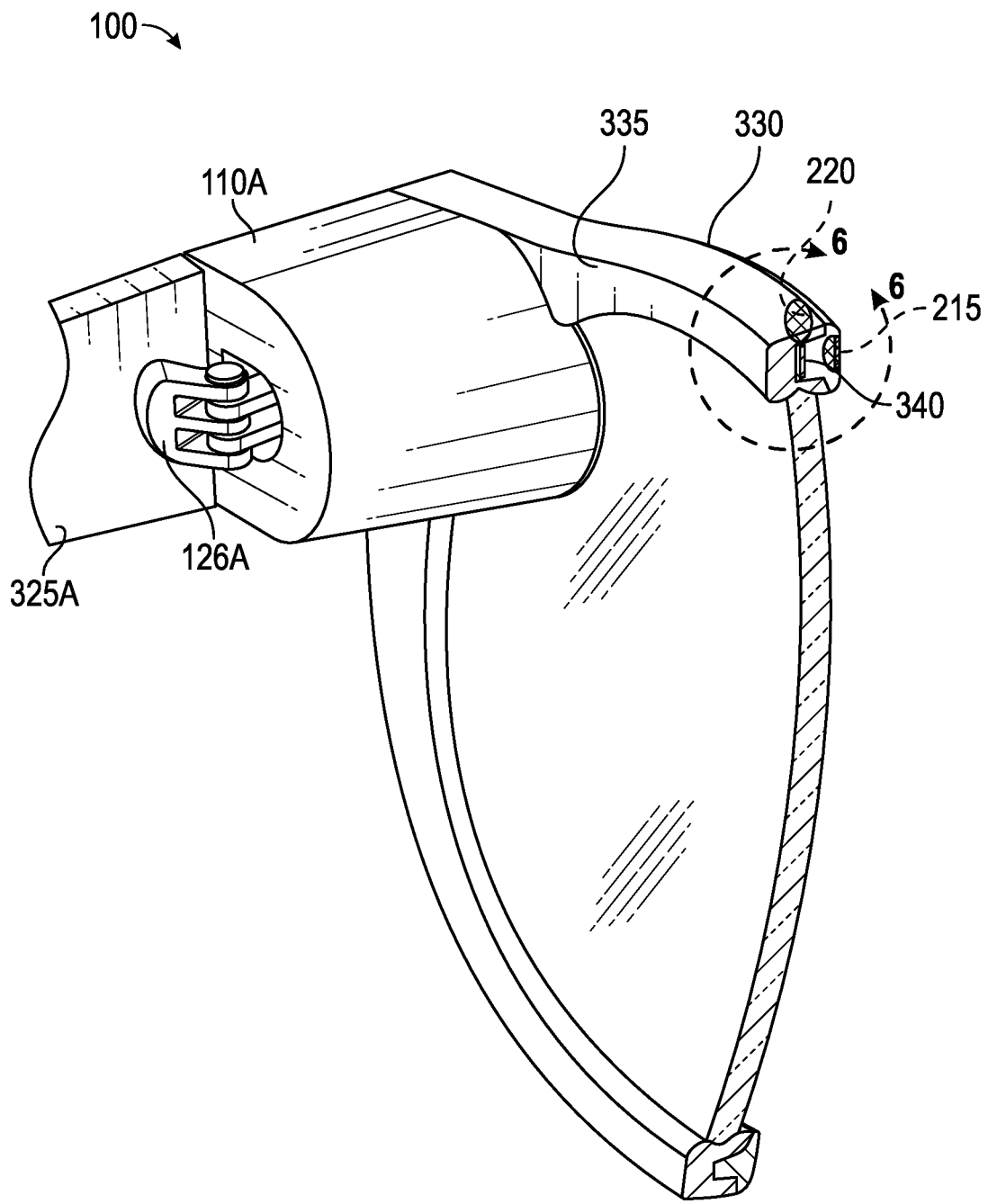
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left electronic housing 110A to the left temple 325A via the left hinge 126A. In some examples, components of the depth sensor 213, including the infrared emitter 215, the flexible PCB 340, or other electrical connectors or contacts may be located on the left temple 325A or the left hinge 126A.

Figure 6:
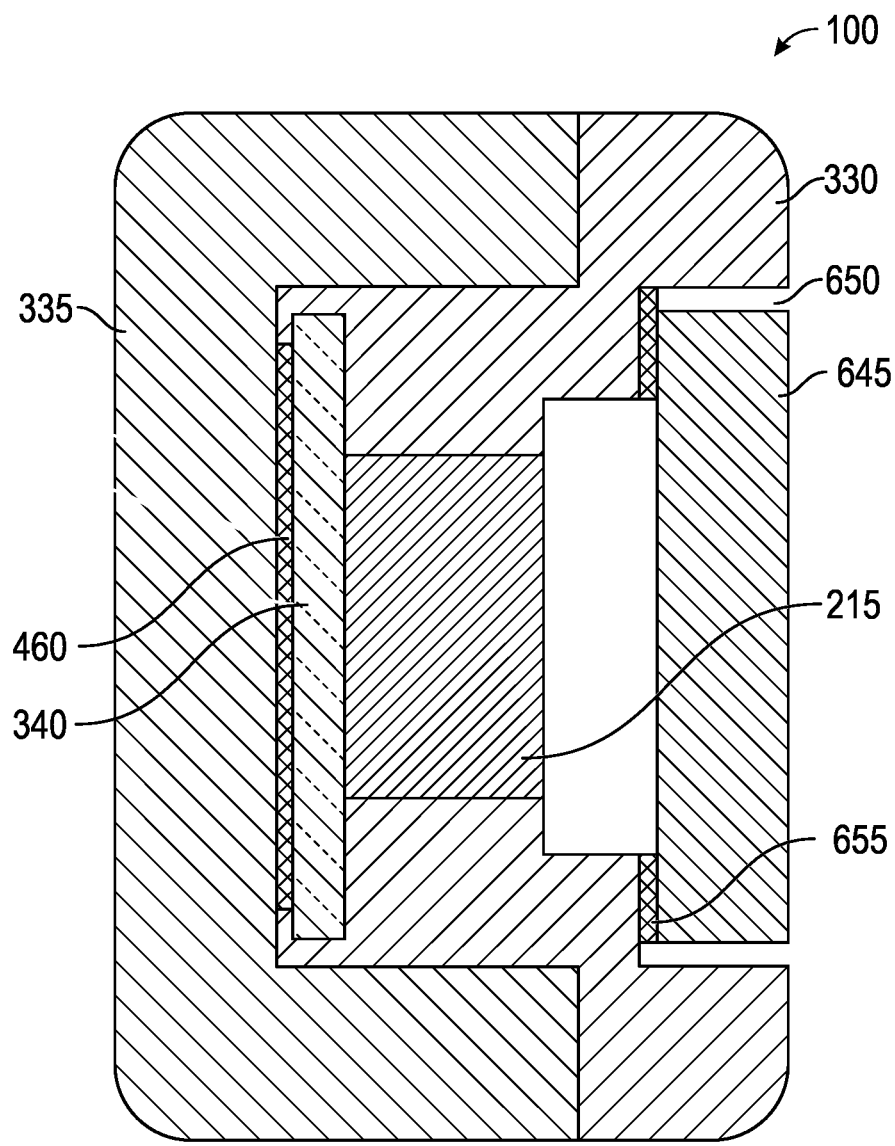
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

Figure 7:
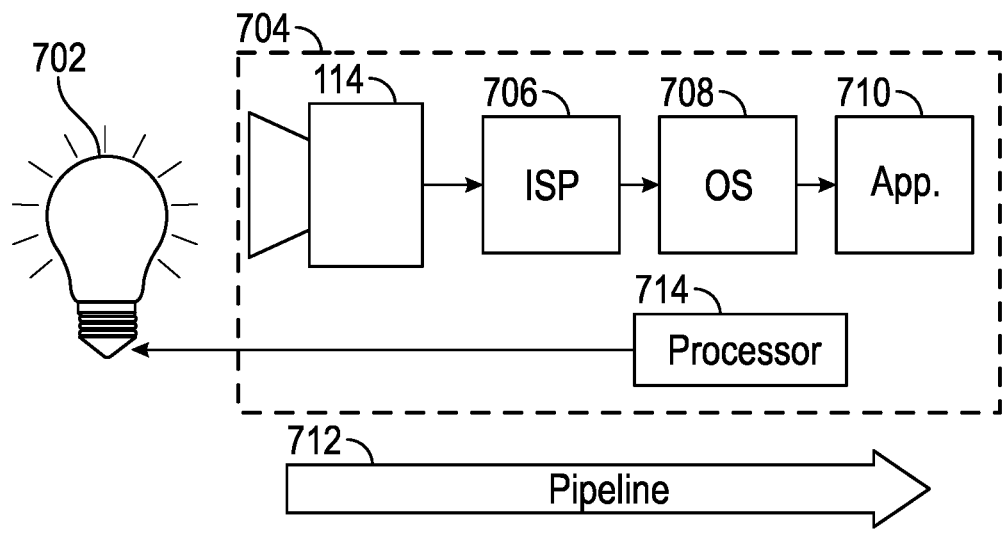
FIG. 7 is a block diagram depicting an example camera pipeline for processing an image including a barcode for use in determining exposure timestamp error in the camera pipeline.

FIG. 7 is a block diagram depicting an example camera system 704 including components for processing an image including a time-coded barcode for use in determining exposure timestamp error of the camera system 704. The camera system 704 includes an image sensor 114, an ISP 706, an OS 708, and an imaging application 710, which make up a pipeline 712 for capturing and processing images.

The light source 702, under control of a processor 714 (e.g., processor 932 or an external processor of a test generation system; TGS), generates a pattern of light that is presented to an image sensor 114. The light source 702 may be a LED that emits white light or other light capable of detection by the image sensor 114. The processor 714 is configured to modulate the light source (e.g., via pulse width modulation; PWM) with a time at which the light source 702 starts presenting the pattern of light for exposure by the image sensor 114.

A light diffuser (not shown) formed of a conventional translucent material may be positioned between the light source 702 and the image sensor 114 to diffuse the light from the light source 702, thereby producing uniform light coverage over the entire imaging surface of the image sensor 114. The light diffuser and its proximity to the light source 702 additionally blocks out other image information.

The light source 702 is driven using conventional electronics and has a relatively fast reaction time (i.e., how fast it can be turned off and on when power is turned on and off by the electronics). By setting the exposure time of the image sensor 114 to be very short (e.g., 10 microseconds per line), multiple lines of information can be conveyed in a single image.

The image sensor 114 includes an array of sensors on a semiconductor chip (CMOS). As light strikes this sensor array, the chip exposes the image by converting the resulting signals into image pixels to obtain a raw image. In one example, the chip may perform additional processing such as signal conditioning. In one example, the image sensor 114 adds a timestamp to the raw image corresponding to the time at which the chip initiated the exposure (exposure timestamp).

The ISP 706 transforms the image and the image format. The ISP 706 may be a separate component or may be integrated into a System on a Chip (SoC). The ISP 706 performs a variety of transformations to the image and the image format including, but not limited to, one or more of a Bayer transformation, demosaicing, noise reduction, image sharpening, focusing, exposing, and white balancing. A suitable ISP 706 will be understood by one of skill in the art from the description herein. In one example, the ISP 706 adds a timestamp corresponding to the time at which the image was expose (exposure timestamp) in addition to or instead of the image sensor 114.

The OS 708 provides an interface between the internal and external hardware. In one example, the OS 708 provide an interface to the Hardware Abstraction Layer (HAL) on a SoC including the ISP 706 and the image sensor 114, and is the first piece of software that receives the arriving image. The OS 708 additional provides notice to the imaging application 710 that an image is available. In one example, the OS 708 adds a timestamp corresponding to the time at which the image was expose (exposure timestamp) in addition to or instead of the image sensor 114 or ISP 706.

The imaging application 710 receives and uses the image. The imaging application 710 is a software component configured to process the image, e.g., for display, modification, and storage. In one example, the imaging application adds a timestamp corresponding to the time at which the image is available for use (application timestamp).

Figure 8:
FIG. 8 is a barcode for use with the camera pipeline of FIG. 7 to determine exposure timestamp error.

FIG. 8 is an image 802 including a time-encoded barcode 804 for use with the camera system 704 of FIG. 7 to determine exposure timestamp error in the pipeline 712. The illustrated barcode 804 includes a 14-bit binary value including a relatively long light pulse 806a representing a start bit followed by fourteen shorter pulses 808 encoding the timestamp. The relatively short pulses include a shorter pulse 808a representing 1 s and a longer pulse 808b representing 0s. Each encoded timestamp starts with a start bit 806 that corresponds to the encoded timestamp. As illustrated, the barcode 804 may be preceded by bits 812 from a prior timestamp and may be followed by another barcode starting with another start bit 806b.

Figure 9:
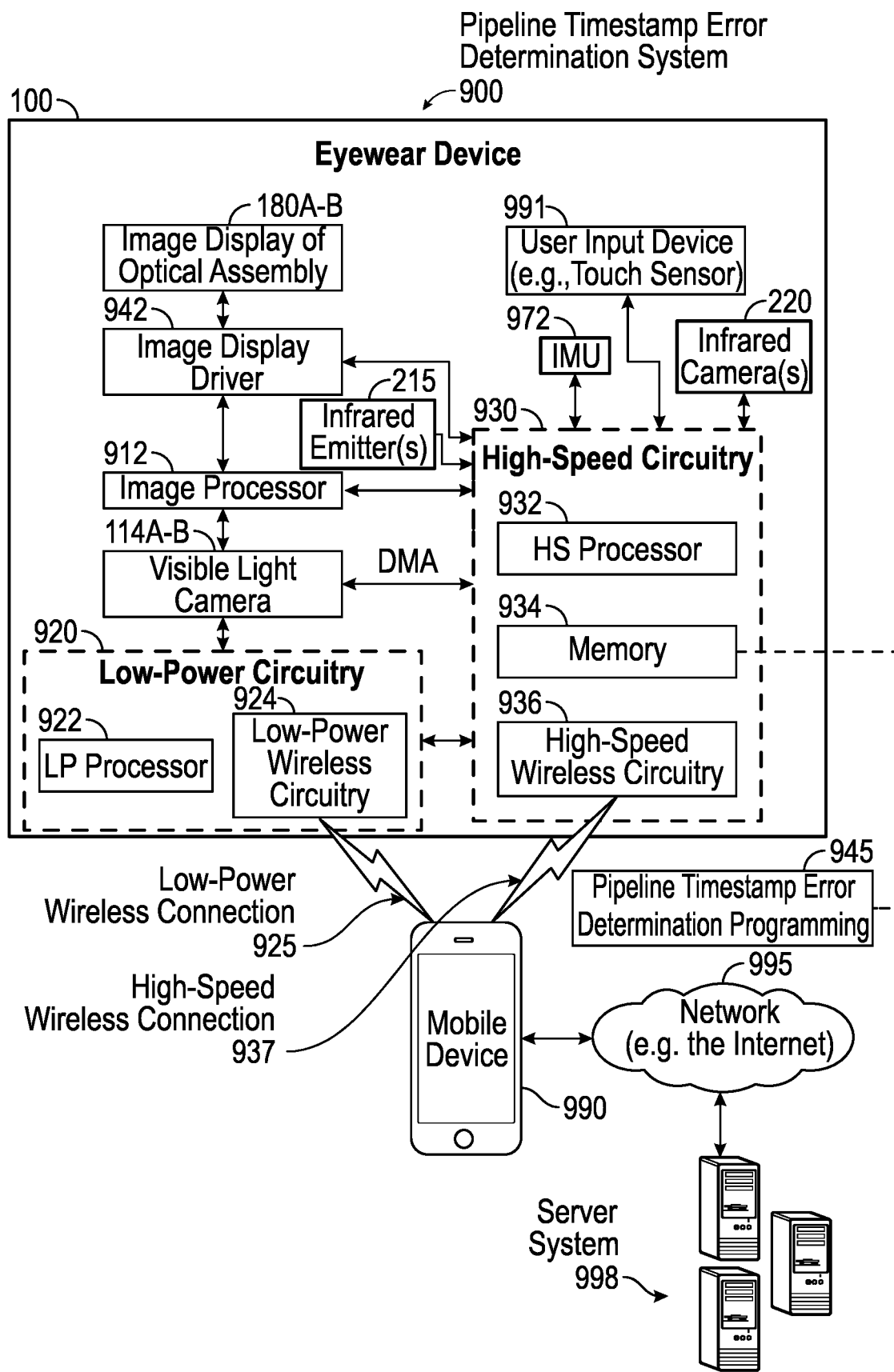
FIG. 9 is a high-level functional block diagram of an example camera pipeline exposure timestamp error determination system including the eyewear device, a mobile device, and a server system connected via various networks.

FIG. 9 is a high-level functional block diagram of an example camera pipeline exposure timestamp error determination system 900, which includes a wearable device (e.g., the eyewear device 100), a mobile device 990, and a server system 998 connected via various networks. Eyewear device 100 includes an input parameter processor and a depth-capturing camera, such as at least one of the visible light cameras 114A and 114B; and the depth sensor 213, shown as infrared emitter 215 and infrared camera 220. The depth-capturing camera can alternatively include at least two visible light cameras 114A and 114B (one associated with the left lateral side 170A and one associated with the right lateral side 170B). Depth-capturing camera generates initial depth images 961A-N of initial video 960, which are rendered three-dimensional (3D) models that are texture mapped images of red, green, and blue (RGB) imaged scenes. A transformation function 965 within the wearable device rectifies the initial images, e.g., to facilitate matching of features and to format the images for viewing.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A and 180B (one associated with the left lateral side 170A and one associated with the right lateral side 170B). Eyewear device 100 also includes image display driver 942, image processor 912, low-power circuitry 920, and high-speed circuitry 930. Image display of optical assembly 180A and 180B are for presenting images and videos, which can include a sequence of depth images, such as the initial depth images from an initial video 960. Image display driver 942 is coupled to the image display of optical assembly 180A and 180B to control the image display of optical assembly 180A and 180B to present the video including images, such as, for example, the initial depth images of an initial video. Eyewear device 100 further includes a user input device 991 (e.g., touch sensor) to receive input and selections from a user.

The components shown in FIG. 9 for the eyewear device 100 are located on one or more circuit boards, for example a PCB or flexible PCB, in the rims or temples. Alternatively, or additionally, the depicted components can be in the electronic housings, frames, hinges, or bridge of the eyewear device 100. Left and right visible light cameras 114A and 114B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device 100 includes a memory 934 which includes input parameter programming and camera pipeline exposure timestamp error determination programming 945 to perform a subset or all the functions described herein for camera misalignment compensation.

As shown, eyewear device 100 includes an orientation sensor, which includes, for example, an inertial measurement unit (IMU) 972 as depicted. Generally, an inertial measurement unit 972 is an electronic device that measures and reports a body's specific force, angular rate, and sometimes the magnetic field surrounding the body, using a combination of accelerometers and gyroscopes, sometimes also magnetometers. In this example, the inertial measurement unit 972 determines a head orientation of a wearer of the eyewear device 100 which correlates to a camera orientation of the depth-capturing camera of the eyewear device 100 when the associated depth image is captured. The inertial measurement unit 972 works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers detect acceleration along the horizontal (X), vertical (Y), and depth (Z) axes defined above, which can be defined relative to the ground, the eyewear device 100, the depth-capturing camera, or the user wearing the eyewear device 100.

Memory 934 includes head orientation measurements which correspond to principal axes measurements on the horizontal axis (X axis), vertical axis (Y axis), and depth or distance axis (Z axis) as tracked (e.g., measured) by the inertial measurement unit 972. The head orientation measurements are utilized to determine alignment of the depth-capturing camera, which can be used to identify a floor plane of initial depth images. In certain applications of IMUs, the principal axes are referred to as pitch, roll, and yaw axes.

A flowchart outlining functions which can be implemented in the camera pipeline exposure timestamp error determination programming 945 is shown in FIGS. 11A-D.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A and 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In some examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 manages data transfers with high-speed wireless circuitry 936. In some examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or Wi-Fi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A and 114B, infrared camera 220, and the image processor 912, as well as images and videos generated for display by the image display driver 942 on the image displays of the optical assembly 180A and 180B. While memory 934 is shown as integrated with high-speed circuitry 930, in other examples, memory 934 may be an independent standalone element of the eyewear device 100. In some such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 10:
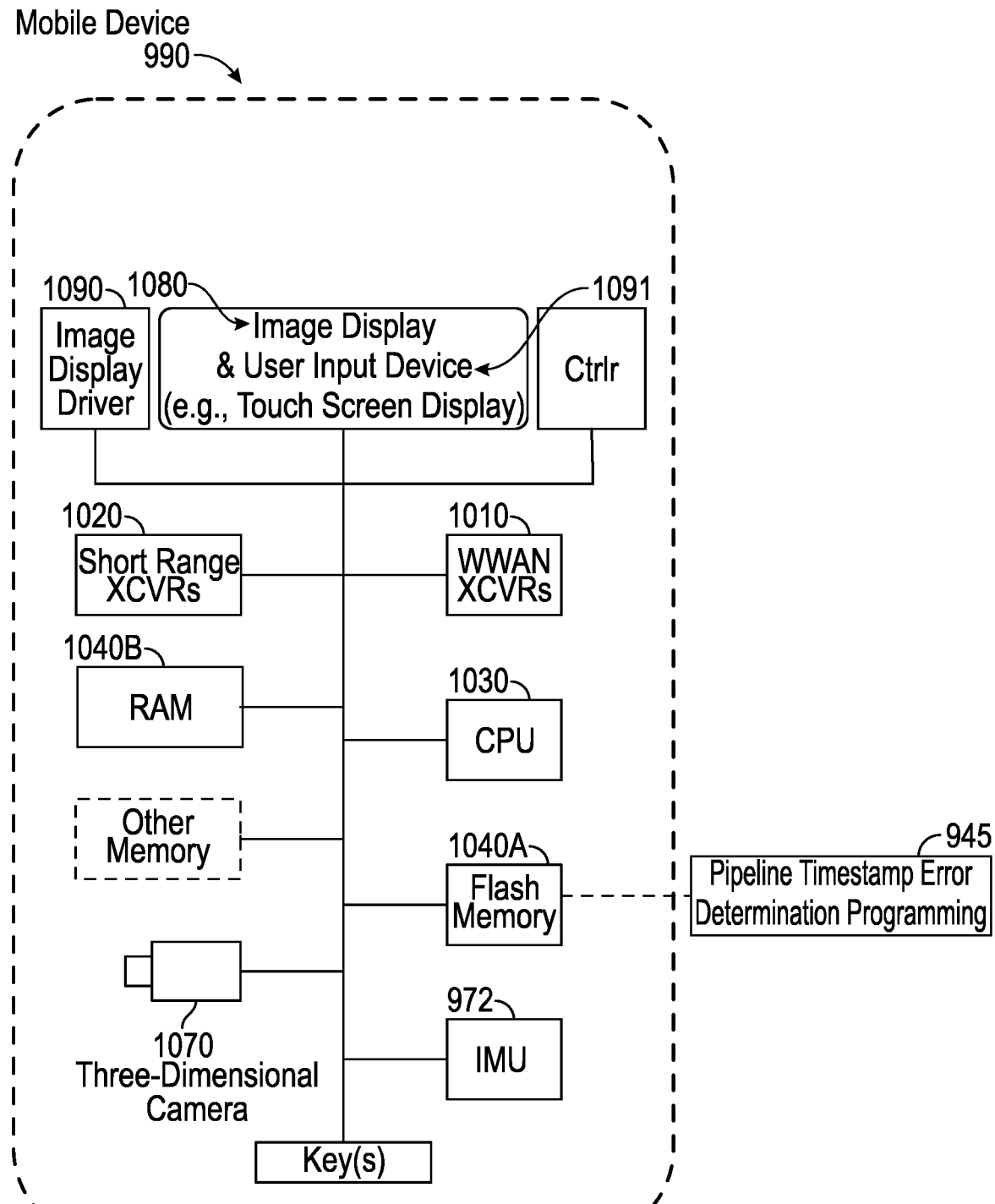
FIG. 10 is block diagram illustrating an example hardware configuration for the mobile device of the camera pipeline exposure timestamp error determination system of FIG. 9.
Figure 11A:
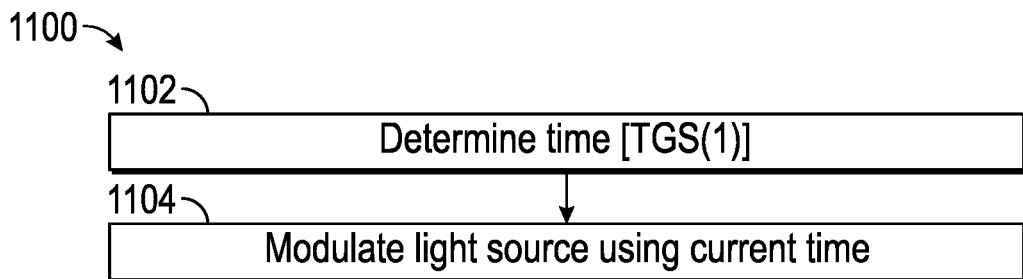
FIGS. 11A, 11B, 11C and 11D are flowcharts of methods the camera exposure timestamp error determination system implements to determine exposure timestamp error in the pipeline of a rolling shutter camera system.
Figure 11B:
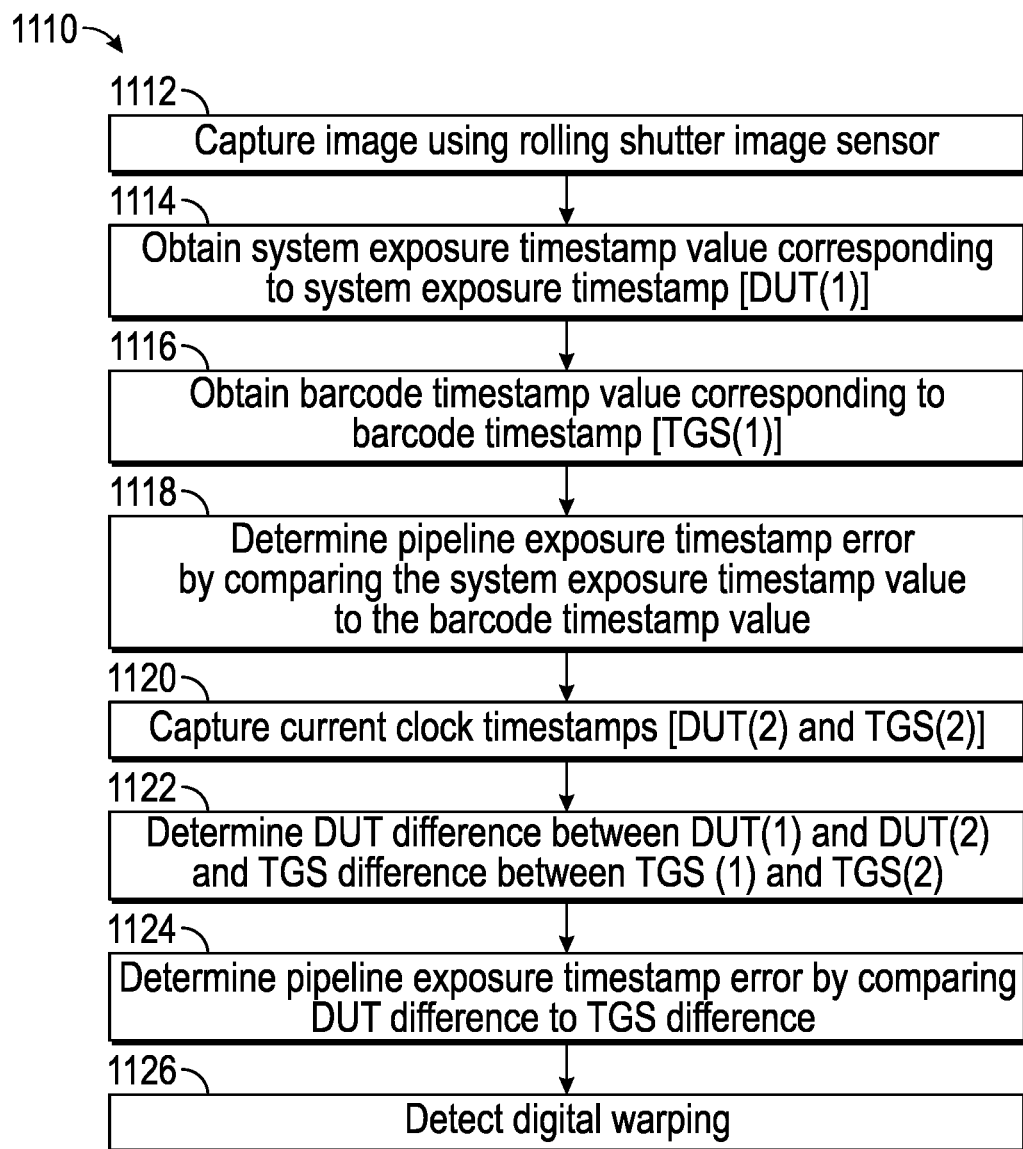
Figure 11C:
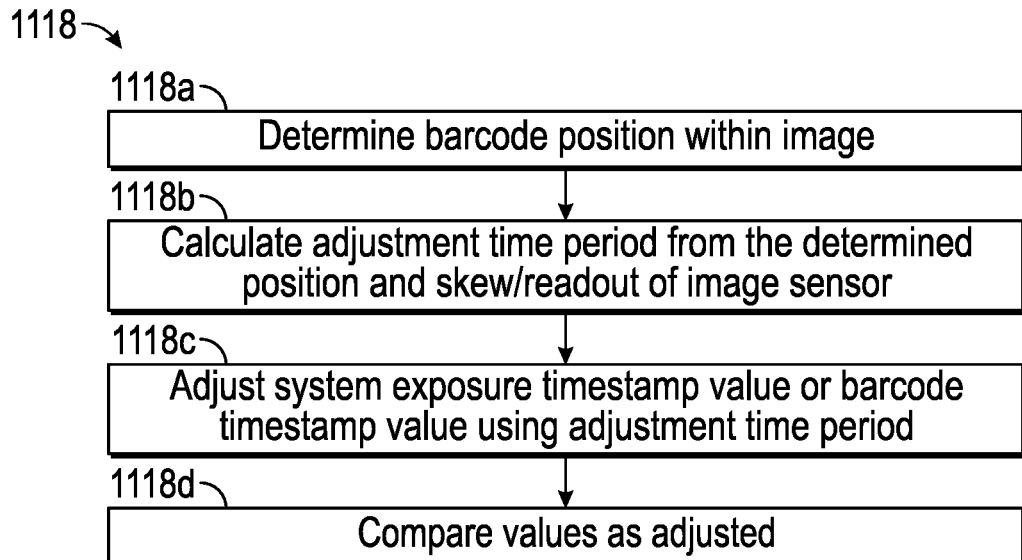
Figure 11D:
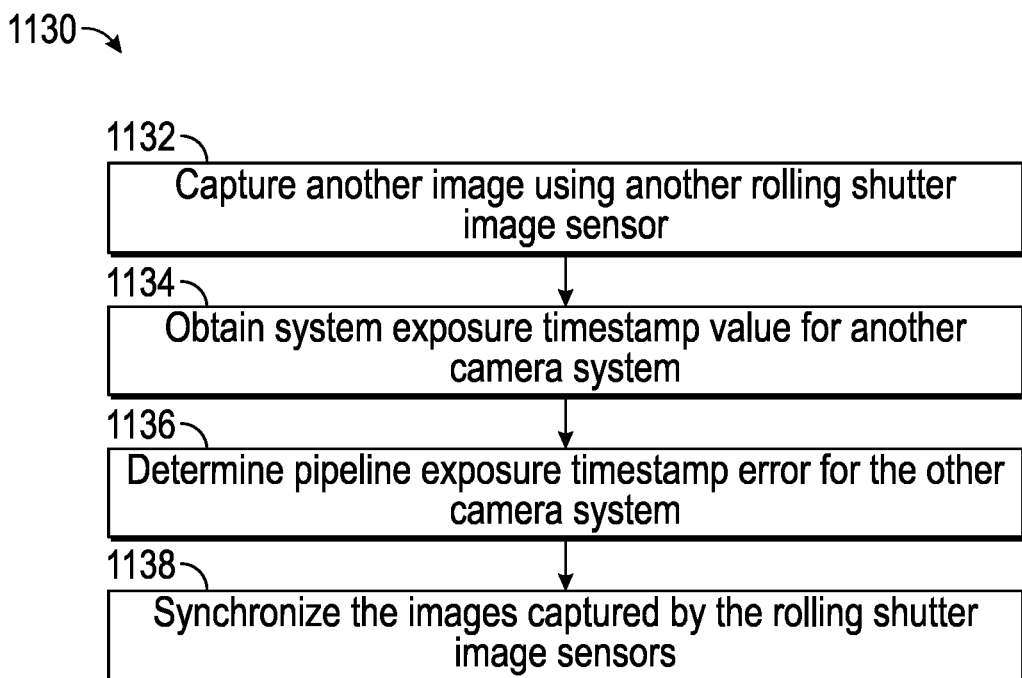

As shown in FIG. 9, the processor 932 of the eyewear device 100 can be coupled to the depth-capturing camera (visible light cameras 114A and 114B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the camera pipeline exposure timestamp error determination programming 945 in the memory 934 by the processor 932 of the eyewear device 100. Mobile device 990 can perform all or a subset of any of the following functions described below as a result of the execution of the camera pipeline exposure timestamp error determination programming 945 in the memory 1040A by the processor 1030 of the mobile device 990.

In one example, the depth-capturing camera of the eyewear device 100 includes the at least two visible light cameras comprised of a left visible light camera 114A with a left field of view 111A and a right visible light camera 114B with a right field of view 111B. The left field of view 111A and the right field of view 111B have an overlapping field of view. The depth-capturing camera 1070 of the mobile device 990 can be similarly structured.

In an example, the depth-capturing camera of the eyewear device 100 includes the at least one visible light camera 114A and the depth sensor 213 (e.g., infrared emitter 215 and infrared camera 220). The at least one visible light camera 114A and the depth sensor 213 have a substantially overlapping field of view 812 (see FIG. 8A). The depth sensor 213 includes an infrared emitter 215 and an infrared camera 220. The infrared emitter 215 is connected to the frame 105 or the temple 125A and 125B to emit a pattern of infrared light. The infrared camera 220 is connected to the frame 105 or the temple 125A and 125B to capture reflection variations in the emitted pattern of infrared light. The depth-capturing camera 1070 of the mobile device 990 can be similarly structured.

In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 991, 1091, input parameter identification from the user includes receiving, on the input surface of the touch sensor, the at least one finger contact inputted from the user.

A touch-based user input device 991 can be integrated into the eyewear device 100. As noted above, eyewear device 100 includes an electronic housing 110A and 110B integrated into or connected to the frame 105 on the lateral side 170A and 170B of the eyewear device 100. The frame 105, the temple 125A and 125B, or the electronic housing 110A and 110B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A and 180B as described in FIGS. 2B and 2C (e.g., a display such as a liquid crystal display (LCD), a plasma display panel (PDP), a light emitting diode (LED) display, a projector, or a waveguide). Left and right image displays of optical assembly 180A and 180B can present the initial video including the sequence of initial depth images. The image displays of the optical assembly 180A and 180B are driven by the image display driver 942. Image display driver 942 is coupled to the image display to control the image display to present the initial video. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), biometric components (e.g., a heart rate monitor) and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990. Mobile device 990 includes a user input device 1091 and an input parameter processor 1092 to receive user selections. Mobile device 990 includes a flash memory 1040A which includes camera pipeline exposure timestamp error determination programming 945 to perform all or a subset of the functions described herein. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100.

Memory 1040A further includes multiple initial depth images, which are generated, via the depth-capturing camera of the eyewear device 100 or via the depth-capturing camera 1070 of the mobile device 990 itself. Memory 1040A further includes an initial video, which includes a sequence of the initial depth images and associated time coordinates. Flowcharts outlining functions which can be implemented in the camera pipeline exposure timestamp error determination programming 945 are shown in FIGS. 11A-11D.

As shown, the mobile device 990 includes an image display 1080, an image display driver 1090 to control the image display, and a user input device 1091 like the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or Wi-Fi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interface) conform to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990.

Several of these types of communications through the transceivers 1010, 1020 and a network, as discussed previously, relate to protocols and procedures in support of communications with the eyewear device 100 or the server system 998. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the camera pipeline exposure timestamp error determination programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g., as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including camera pipeline exposure timestamp error determination programming 945, are executed. Applications, such as the camera pipeline exposure timestamp error determination programming 945, may be a native application or a hybrid application that runs on mobile device 990. Examples of mobile operating systems include Google Android, Apple iOS (I-Phone or iPad devices), Windows Mobile, Amazon Fire OS, RIM BlackBerry operating system, or the like.

FIGS. 11A, 11B, 11C, and 11D are flowcharts 1100, 1110, 1118, and 1130, respectively, illustrating the operation of the eyewear device 100 and other components of the camera pipeline exposure timestamp error determination system 900 (e.g., one or more of the processors 912, 932 executing instructions stored in memory 934 such as camera pipeline exposure timestamp error determination programming 945). The steps are described with reference to hardware described herein but are not to be limited to such implementations. Although shown as occurring serially, the blocks of FIGS. 11A, 11B, 11C, and 11D may be reordered or parallelized depending on the implementation. Furthermore, one of skill in the art will understand from the description herein that one or more steps/blocks may be omitted, and one or more additional/alternative steps may be incorporated.

At block 1102, a processor 714 of a test generation system (TGS) determines a current time and generates a modulation sequence for encoding the current time for transmission and detection. The TGS processor 714 may be a processor of the device under test (DUT), a separate processor coupled to the processor of the DUT, or a processor synchronized to the processor of the DUT. In an example, the processor 714 runs an application that constantly generates modulation sequences from a clock source (e.g., the system clock) for transmission via the VLC method described herein. These modulation sequences (which result in barcode images captured by the rolling shutter sensor 114; barcode timestamps) are independent of the system exposure timestamps the camera system 704 (the device under test; DUT) attaches to the image. To facilitate description, the barcode timestamp and the system exposure timestamp are referred to using the time domains of the TGS clock source and the DUT clock source, respectively (which may be the same if the TGS and the DUT are the same device or share a clock).

At block 1104, the processor 714 modulates the light source 702 using the current time modulation sequence. In an example, the processor 714 converts the current time modulation sequence to a binary value and actuates a switch (not shown) coupled to the light source 702 to selectively turn the light source 702 on and off in accordance with the binary representation. The switch may be a field effect transistor (FET) circuit connected between the light source 702 and an output of the processor 714. In one example, the processor 714 is part of the DUT (e.g., processor 932 or processor 1030). In another example, the processor 714 is incorporated into another device. The processor 714, in a repeating loop, continuously captures the time from the source clock (either the DUT clock source or the TGS clock source), converts the captured time into an appropriate form (e.g., binary representation), and transmits the binary representation using the light source 702.

In an example, the processor 714 encodes the current time modulation sequence using pulse width modulation (PWM). This enables determining on which line of the rolling shutter image sensor a resulting image begins, which is useful in determining a time difference between the start of the image capture by the rolling shutter camera system and when the timestamp based on the current time modulation sequence was generated. In one example, the processor 714 and the light source 702 modulate a 14-bit binary value (which may have more or fewer values depending on the desired level of granularity in time) by using a relatively long light pulse 806a as a start bit followed by short pulses including shorter pulse 808a and longer pulses 808b representing 1s and 0s, respectively. A long light pulse 806 may be 100 microseconds, a shorter pulse 808a may be 20 microseconds, and a longer pulse 808b may be 40 microseconds, for example.

At block 1112, the camera system 704 captures an image using a rolling shutter image sensor 114 (e.g., visible light camera 114A). The image captured by the camera system 704 includes a bar code encoded with the current time responsive to the light source 702.

In an example of an image capture, the rolling shutter image sensor 114 converts light from the light source into image pixels to get a raw image, the ISP 706 transforms the raw image into a processed image, the OS 708 receives the processed image and informs the imaging application 710 that the processed image is available. One or more of the image sensor 114, the ISP 706, or the OS 708 may add a timestamp corresponding to the exposure of the image on the image sensor 114 (system exposure timestamp), which is based on the clock source of the DUT. The imaging application 710 may add an application timestamp (which is based on the clock source of the DUT) to the image metadata representing a time at which the image is available for use. Additionally, the imaging application 710 may store the image with the metadata including the system exposure timestamp and the application timestamp in the memory 934.

At block 1114, the processor 714 obtains a system exposure timestamp value corresponding to the system exposure timestamp added by the rolling shutter camera system 704. In an example, the processor 714 retrieves the image along with the associated metadata from the memory 934 and parses the metadata to retrieve the system exposure timestamp.

If the processor 714 of the DUT is the processor for the TGS, the system exposure timestamp will be in the same time domain as the barcode timestamp. If the processor for the DUT is not the processor of the TGS, the clock used by the processor of the DUT may be synchronized with the clock used by the processor of the TGS prior to determining the current time modulation sequence (see block 1102). In accordance with these examples, the system exposure timestamp value equals the system exposure timestamp added by the rolling shutter camera system 704.

At block 1116, the processor 714 obtains a barcode timestamp value corresponding to the barcode timestamp determined by decoding the bar code in the image. In an example, the processor 714 determines the barcode timestamp by identifying a bar code 804 within a captured image 802 and decoding the bands of light in the image into a binary timestamp by reversing the process used to encode the timestamp (see blocks 1102 and 1104).

Where the processor 714 of the DUT is the processor for the TGS, the barcode timestamp will be in the same time domain as the system exposure timestamp. If the processor for the DUT is not the processor of the TGS, the clock used by the processor of the DUT may be synchronized with the clock used by the processor of the TGS prior to determining the current time modulation sequence (see block 1102). In accordance with these examples, the barcode timestamp value equals the barcode timestamp determined by decoding the bar code in the image.

At block 1118, the processor 714 determines a pipeline exposure timestamp error of the rolling shutter camera system 704 by comparing the obtained barcode timestamp value (see block 1116) to the system exposure timestamp value (see block 1114) added to the image 802 by the rolling shutter camera system 704. The system exposure timestamp added by the rolling shutter camera system 704 represents the time at which the image 802 was captured by the rolling shutter camera 114 as determined by the rolling shutter camera 114. Where the start bit 806a of the image 802 corresponds to the first line of the image 802 (i.e., no preceding bits 812), the processor 714 subtracts the exposure timestamp from the barcode timestamp to determine the pipeline exposure timestamp error.

Where the start bit 806a of the image 802 does not correspond to the first line of the image 802 (i.e., preceding bits 812 are present), at least one of the barcode timestamp or the exposure timestamp is adjusted to improve accuracy. In an example, the rolling shutter skew/readout time per line of the sensor is stored in the memory 934 for use in adjusting the timestamp. In accordance with this example, at block 1118a, the processor 714 determines a position of the barcode 804 within the image 808. The processor 714 then determines the position by processing the lines of the image and identifying the number of rows in the image 804 preceding the first row including the first bit 806a of the barcode 804.

At block 1118b, the processor 714 calculates an adjustment time period from the determined position (block 1118a) and the skew/readout of image sensor 114. The processor 714 calculates the adjustment time period by retrieving the skew/readout rate per line from memory 934 and multiplying the retrieved rate by the number of identified lines preceding the barcode 804 (block 1118a).

At block 1118c, the processor 714 adjusts at least one of the barcode timestamp or exposure timestamp using the adjustment time period. In one example, the processor 714 adds the adjustment time to the exposure timestamp. In another example, the processor 714 subtracts the adjustment time from the barcode timestamp. In yet other example, the processor adds a portion of the adjustment time to the exposure timestamp and subtracts the remaining portion from the barcode timestamp.

At block 1118d, the processor 714 compares the barcode timestamp to the exposure timestamp as adjusted (block 1118c). In an example, the processor 714, after timestamp adjustment (block 1118c) subtracts the exposure timestamp from the barcode timestamp to determine the pipeline exposure timestamp error.

At block 1120, the processor 714 determines current timestamps for the DUT and the TGS. In an example, the current timestamp of the DUT is generated by the imaging application 710 and represents the time the image is available for use and the TGS contemporaneously generates a corresponding timestamp.

Where the DUT and the TGS have different clocks (i.e., are in a different time domain, the pipeline exposure timestamp error associated with the image exposure can be determined using the current timestamp for the DUT and TGS (block 1120) as described below with reference to blocks 1122 and 1124. The current timestamps (1120) from the viewpoint of both the DUT and TGS may be synchronized using a conventional clock synchronization technique.

At block 1122, the processor 714 determines a first measurement for the DUT and a second measurement for the TGS. The processor determines the first measurement for the DUT by comparing the determined exposure timestamp to the DUT determined current timestamp (block 1120). In accordance with this example, the system exposure timestamp value (block 1114) is equal to the difference between the DUT determined current timestamp and the system exposure timestamp added by the camera system 704 (e.g., DUT(2)-DUT(1)). The processor determines the second measurement by comparing the obtained barcode timestamp to the TGS determined current timestamp (block 1120). In accordance with this example, the barcode timestamp value (block 1116) is equal to the difference between the TGS determined current timestamp and the barcode timestamp (e.g., TGS(2)-TGS(1)).

At block 1124, the processor 714 determines a pipeline exposure timestamp error. In an example, the processor 714 determines the pipeline exposure timestamp error by comparing the first and second measurements. The processor 714 may determine the error by subtracting the first measurement from the second, with the difference representing the error in the exposure timestamp.

At block 1126, the processor 714 detects digital warping in the image 802. In an example, the processor 714 detects digital warping by comparing features in the image 802 to expected features. For example, the processor 714 expects the lines of the barcode 810 to be horizontal across the image 802. The processor 714 compares the expected result (e.g., horizontal lines) to the actual results (e.g., non-horizontal lines) using a conventional image processing algorithm. Additionally, using the conventional image processing algorithm, the processor may determine the degree by which the actual results diverge from the expected results. In one example, if the divergence between the expected and actual results are above a threshold value, the imaging system may be identified as defective. In another example, the processor 714 may apply a correction factor based on the degree of divergence when processing the image 802 such that the image 802 is corrected to present/depict the expected result.

At block 1132, the processor 714 captures another image using another rolling shutter image sensor (e.g., visible light camera 114B). The processor 714 may capture the image as described above with reference to block 1112 (FIG. 11B). In an example, the other image captured by the other image sensor 114B includes the same time-encoded barcode captured in the image by the image senor 114A. In another example, the other image captured by the other image sensor 114B includes another time-encoded barcode.

At block 1134, the processor 714 determines another system exposure timestamp. The processor 714 may determine the other system exposure timestamp for the other captured image as described above with reference to block 1114.

In examples where the other image captured by the other image sensor 114B includes the same time-encoded barcode captured in the image by the image senor 114A, the barcode timestamp obtained at block 1116 may be used for the following step. In examples where the other image captured by the other image sensor 114B includes another time-encoded barcode, another barcode timestamp may be used in the following steps that is determined and optionally adjusted for the other image as described above with reference to blocks 1116 and 1118, substituting the barcode in the other image captured by the other image sensor 114B for the barcode in the image captured by the image sensor 114A.

At block 1136, the processor 714 determines another pipeline exposure timestamp error. The processor 714 may determine the other pipeline exposure timestamp error as described above with reference to block 1118. In examples where the other image captured by the other image sensor 114B includes the same time-encoded barcode captured in the image by the image senor 114A, the barcode timestamp obtained at block 1116 is used to determine the other pipeline exposure timestamp error as described with reference to block 1118 substituting the system exposure timestamp (block 1114) with the other system exposure timestamp (block 1134). In examples where the other image captured by the other image sensor 114B includes another time-encoded barcode, the processor 714 determines the other pipeline exposure timestamp error as described with reference to block 1118 by substituting the system exposure timestamp (block 1114) with the other system exposure timestamp (block 1134) and substituting the obtained barcode timestamp (block 1116) with another barcode timestamp that is determined and optionally adjusted for the other image.

At block 1138, the processor 714 synchronize the images captured by a pair of rolling shutter image sensors (e.g., image sensors 114A and 114B). In an example, the processor 714 first determines a difference between the pipeline exposure timestamp error of the pipeline including one image sensor 114A and the pipeline exposure timestamp error of the pipeline including the other image sensor 114B. In one example, the processor 714 then adjusts one or more components of the camera pipeline with the least exposure timestamp error to add the determined difference to increase its exposure timestamp error to match the exposure timestamp error of the slower camera pipeline. Exposure timestamp error may be added by the processor 714 through at least one of hardware adjustments to the ISP 706 or software adjustments to the OS 708 or imaging application 710. In another example, the processor 714 adjusts the metadata timestamps of images obtained using one image sensor, the other image sensor, or a combination thereof so that the images both are in a common time domain, which is advantageous for augmented reality applications.

The camera pipeline exposure timestamp error determination functionality described herein for the eyewear device 100, mobile device 990, and server system 998 can be embodied in one or more applications as described previously. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An exposure timestamp error determination system for a rolling shutter camera, the system comprising:
   a rolling shutter camera pipeline of a device under test (DUT) including a rolling shutter image sensor configured to capture an image generated from a light source of a test generation system (TGS); and
   a processor configured to:
   capture the image using the rolling shutter image sensor, the image including a bar code encoded with a barcode timestamp;
   obtain a system exposure timestamp value corresponding to a system exposure timestamp, the system exposure timestamp determined by the rolling shutter camera pipeline for the captured image;
   obtain a barcode timestamp value corresponding to the barcode timestamp encoded in the bar code of the captured image; and
   determine an exposure timestamp error for the rolling shutter camera by comparing the barcode timestamp value to the system exposure timestamp value.

2. The system of claim 1, wherein the barcode timestamp value is equal to a value of the barcode timestamp encoded in the bar code of the captured image, the system exposure timestamp value is equal to the system exposure timestamp determined by the rolling shutter camera pipeline, and the exposure timestamp error is a difference between the barcode timestamp value and the system exposure timestamp value.

3. The system of claim 1, wherein the processor is further configured to:
record a DUT value corresponding to a DUT current time from a DUT clock; and
record a TGS value corresponding to a TGS current time from a TGS clock;
wherein the barcode timestamp value is equal to a first difference between the barcode timestamp encoded in the bar code of the captured image and the TGS current time, the system exposure timestamp value is equal to a second difference between the system exposure timestamp determined by the rolling shutter camera pipeline and the DUT current time, and the exposure timestamp error is a difference between the barcode timestamp value and the system exposure timestamp value.

4. The system of claim 1, further comprising:
a light source configured to generate the image.

5. The system of claim 4, wherein the light source is a light emitting diode.

6. The system of claim 4, further comprising a diffuser positioned between the light source and the rolling shutter image sensor.

7. The system of claim 4, wherein the light source is pulse width modulated to generate the bar code.

8. The system of claim 7, wherein the light source is pulse width modulated by transmitting a start pulse having a first duration followed by a series of first bit-type pulses and second bit-type pulses, wherein the first bit-type pulses have a second duration different than the first duration and the second bit-type pulses have a third duration different than the second duration.

9. The system of claim 1, further comprising:
another rolling shutter camera pipeline including another rolling shutter image sensor;
wherein the processor is further configured to:
capture another image of the bar code using the other rolling shutter image sensor;
obtain another system exposure timestamp value corresponding to another system exposure timestamp, the other system exposure timestamp determined by the other rolling shutter image pipeline;
determine another exposure timestamp error for the rolling shutter camera system by comparing the barcode timestamp value to the other system exposure timestamp value; and
synchronize images captured by the rolling shutter image sensors by correcting for an offset between the exposure timestamp error and the other exposure timestamp error.

10. The system of claim 1, wherein to determine the exposure timestamp error the processor is configured to:
determine a position of the barcode within the image;
calculate an adjustment time period from the determined position and a rolling shutter skew or readout time of the rolling shutter image sensor; and
adjust at least one of the barcode timestamp or the system exposure timestamp using the adjustment time period; and
compare the barcode timestamp to the system exposure timestamp as adjusted by the adjustment time period to determine the exposure timestamp error.

11. The system of claim 1, wherein the processor is further configured to:
determine an application timestamp for the rolling shutter camera system;
determine a first latency measurement by comparing the exposure timestamp to the application timestamp; and
determine a second latency measurement by comparing the obtained barcode timestamp to the application timestamp;
wherein the exposure timestamp error is determined by comparing the first latency measurement to the second latency measurement.

12. The system of claim 1, wherein the processor is further configured to:
detect digital warping of the image by comparing an actual aspect of the image to an expected aspect of the image.

13. A method for determining exposure timestamp error in a rolling shutter camera, the method comprising:
capturing an image using a rolling shutter image sensor of a rolling shutter image pipeline of the rolling shutter camera, the image including a bar code encoded with a barcode timestamp;
obtaining a system exposure timestamp value corresponding to a system exposure timestamp, the system exposure timestamp determined by the rolling shutter camera pipeline for the captured image;
obtaining a barcode timestamp value corresponding to the barcode timestamp encoded in the bar code of the captured image; and
determining an exposure timestamp error for the rolling shutter camera comparing the barcode timestamp value to the system exposure timestamp value.

14. The method of claim 13, further comprising:
recording a DUT value corresponding to a DUT current time from a DUT clock; and
recording a TGS value corresponding to a TGS current time from a TGS clock;
wherein the barcode timestamp value is equal to a first difference between the barcode timestamp encoded in the bar code of the captured image and the TGS current time, the system exposure timestamp value is equal to a second difference between the system exposure timestamp determined by the rolling shutter camera pipeline and the DUT current time, and the exposure timestamp error is a difference between the barcode timestamp value and the system exposure timestamp value.

15. The method of claim 13, further comprising:
pulse width modulating a light source to generate the image including the bar code.

16. The method of claim 15, wherein the pulse width modulating comprises:
transmitting a start pulse having a first duration; and
transmitting a series of first bit-type pulses and second bit-type pulses, wherein the first bit-type pulses have a second duration different than the first duration and the second bit-type pulses have a third duration different than the second duration.

17. The method of claim 13, further comprising:
capturing another image of the bar code using another rolling shutter image sensor of another rolling shutter camera pipeline;
obtaining another system exposure timestamp value corresponding to another system exposure timestamp, the other system exposure timestamp determined by the other rolling shutter camera pipeline;
determining another exposure timestamp error for the rolling shutter camera system by comparing the barcode timestamp value to the other exposure timestamp value; and synchronizing images captured by the rolling shutter image sensors by correcting for an offset between the exposure timestamp error and the other exposure timestamp error.

18. The method of claim 13, wherein the determining the exposure timestamp error comprises:
    determining a position of the barcode within the image;
    calculating an adjustment time period from the determined position and a rolling shutter skew or readout time of the rolling shutter image sensor; and
    adjusting at least one of the barcode timestamp or the system exposure timestamp using the adjustment time period; and
    comparing the barcode timestamp to the system exposure timestamp as adjusted using the adjustment time period to determine the exposure timestamp error.

19. The method of claim 13, further comprising:
    determining an application timestamp for the rolling shutter camera system;
    determining a first latency measurement by comparing the exposure timestamp to the determined application timestamp; and
    determining a second latency measurement by comparing the obtained barcode timestamp to the application timestamp;
    wherein the exposure timestamp error is determined by comparing the first latency measurement to the second latency measurement.

20. The method of claim 13, further comprising:
    detecting digital warping of the image by comparing an actual aspect of the image to an expected aspect of the image.

21. A non-transitory computer readable medium comprising instructions which, when executed by a processor, cause an electronic system to:
    capture an image using a rolling shutter image sensor of a rolling shutter image pipeline for a rolling shutter camera, the image including a bar code encoded with a barcode timestamp;
    obtain a system exposure timestamp value corresponding to a system exposure timestamp, the system exposure timestamp determined by the rolling shutter camera pipeline for the captured image;
    obtain a barcode timestamp value corresponding to the barcode timestamp encoded in the bar code of the captured image; and
    determine an exposure timestamp error for the rolling shutter camera by comparing the barcode timestamp value to the system exposure timestamp value.

* * * * *